United States Patent [19]
Langmack, Jr. et al.

[11] 3,868,040
[45] Feb. 25, 1975

[54] EQUIPMENT COVERING

[76] Inventors: Holger C. Langmack, Jr., Chancellor Point Rd., Trappe; James B. Spear, Eveland Rd., Ridgley, both of Md.

[22] Filed: Oct. 30, 1973

[21] Appl. No.: 410,996

[52] U.S. Cl.............................. 220/18, 52/80, 52/247, 174/37, 174/50, 220/4 B, 292/251, 312/284, 312/290
[51] Int. Cl........................... E04h 5/04, E04b 1/32
[58] Field of Search ......... 174/37, 38, 48, 50, 52 R; 317/120; 336/90; 52/64, 69, 80, 82, 245, 247; 220/4 B, 18; 312/100, 257 SM, 257 A, 284, 290

[56] References Cited
UNITED STATES PATENTS

| | | | |
|---|---|---|---|
| 3,023,265 | 2/1962 | Fork | 174/48 |
| 3,315,023 | 4/1967 | Davis | 174/52 R |
| 3,365,535 | 1/1968 | Wilk | 174/50 |
| 3,376,086 | 4/1968 | Fisher | 312/100 |
| 3,404,212 | 10/1968 | Mack et al. | 174/38 |
| 3,513,248 | 5/1970 | Bright et al. | 174/52 R |

FOREIGN PATENTS OR APPLICATIONS

| | | | |
|---|---|---|---|
| 1,001,265 | 8/1965 | Great Britain | 174/50 |
| 391,825 | 9/1965 | Switzerland | 174/38 |

Primary Examiner—Laramie E. Askin
Attorney, Agent, or Firm—Edwin E. Greigg

[57] ABSTRACT

What follows is the description of a shell structure for use as an equipment cover. The shell structure is fabricated in two pieces of moldable plastic. The structure is such that maximum accessibility to and exposure of the equipment being covering is attainable as desired. To effect this result, one of the pieces is mounted to the other piece for pivotal movement relative thereto.

8 Claims, 8 Drawing Figures

PATENTED FEB 25 1975　　3,868,040

EQUIPMENT COVERING

BACKGROUND OF THE INVENTION

The present invention relates to equipment coverings, and more particularly, to a unique covering for use preferably with electrical equipment.

Those experienced in the field of heavy electrical equipment are by now aware of the existence of coverings for this equipment, and in particular, for equipment such as transformers. The coverings were initially developed to protect the equipment against the adverse effects of the elements. There followed other considerations, such as safety, strength, appearance and, to a certain extent, accessibility. With all of these considerations being accumulated, it is readily apparent why a significant number of known coverings are relatively structurally complex and consequently quite expensive to manufacture. Consider in this regard U.S. Pat. No. 3,513,248, issued on May 19, 1970, to William L. Bright, Herbert N. Steinmeyer and James D. Coon. The covering disclosed and claimed in this patent, although an improvement over the then-existing state of the art, is nevertheless from a manufacturing point of view structurally quite complicated. Moreover, there is very limited access to the equipment being covered. Doors are provided for access and, in fact, the specification states that multiple doors can be utilized. The impression created is that, if one desires more access, more doors can be provided. This, of course, tends toward further complexity and not simplicity of design, and really never achieves the degree of accessibility desired, because discrete openings must be separated and separations resullt in obstructions.

It would therefore be desirable to provide a covering for equipment such as electrical equipment, which possesses a desirable aesthetic appearance, is relatively simple and inexpensive to manufacture, possesses a high degree of structural integrity and an optimum degree of accessibility to the equipment being covered.

OBJECTS AND SUMMARY OF THE INVENTION

It is, therefore, a general object of the present invention to provide a covering for equipment, such as electrical equipment, which is unique in its field.

It is another and more specific object of the present invention to provide a covering for equipment, such as electrical equipment, which has optimum accessibility to the equipment being covered.

It is yet another object of the present invention to provide a covering for equipment, such as electrical equipment, which is relatively inexpensive to manufacture and has a low maintenance factor.

It is yet another object of the present invention to provide a covering for equipment, such as electrical equipment, which is light weight and characterized by a high degree of structural integrity.

It is still another object of the present invention to provide a covering for equipment, such as electrical equipment, which is non-corrosive and non-conductive.

It is a related object of the present invention to provide a covering for equipment, such as electrical equipment, where a portion of the covering is intended for sub-surface installation.

These and other objects are accomplished by the present invention, which provides a covering in the form of a shell structure, fabricated in two pieces of moldable plastic with one of the pieces being mounted to the other piece for movement pivotal relative thereto. The relative movement pivotal of the one piece with respect to the other piece ensures the optimum degree of accessibility heretofore unknown to the art.

In those situations where it is desirable not to mount the covering on an equipment pad, the present invention contemplates effecting a sub-surface installation of a portion of the covering. The resulting installation is quite stable and retains the above-mentioned optimum degree of accessibility.

DESCRIPTION OF THE PREFERRED EMBODIMENTS

At the outset it should be noted that the two embodiments disclosed differ essentially in the mode in which they are mounted. In one embodiment, the mounting is preferably made directly to the pad structure on which the equipment itself is mounted, and in the other embodiment, a sub-surface installation is preferred. Other than for this distinction, the two embodiments possess similar characteristics.

Figure 1:
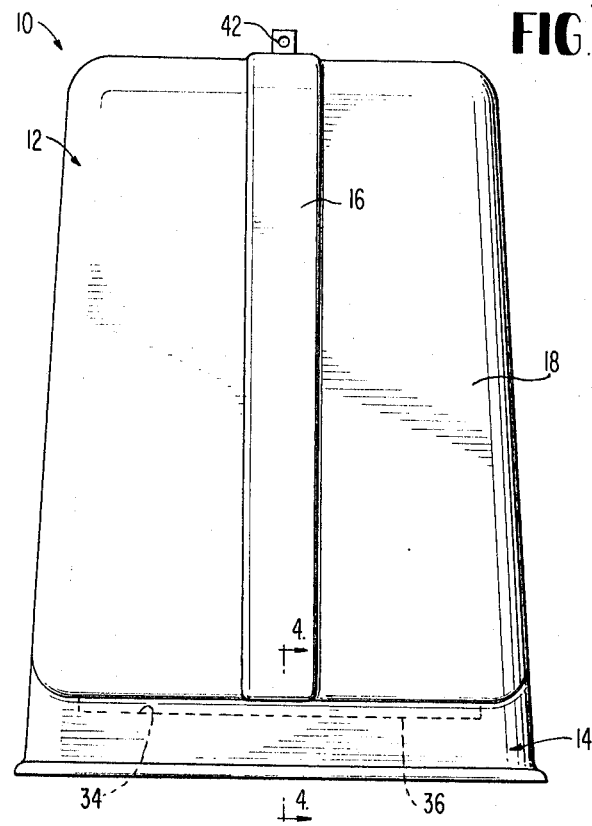
FIG. 1 is a front elevational view of one embodiment of the covering according to the present invention.
Figure 2:
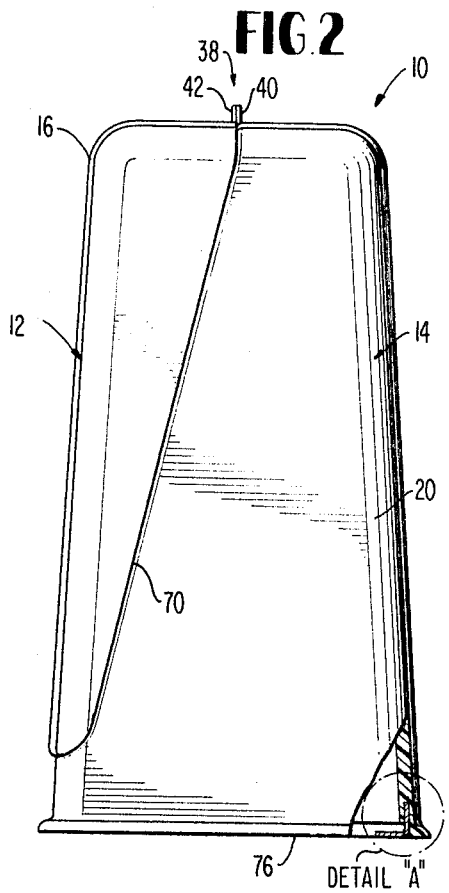
FIG. 2 is a side view partialy in cross section of the embodiment shown in FIG. 1.
Figure 3:
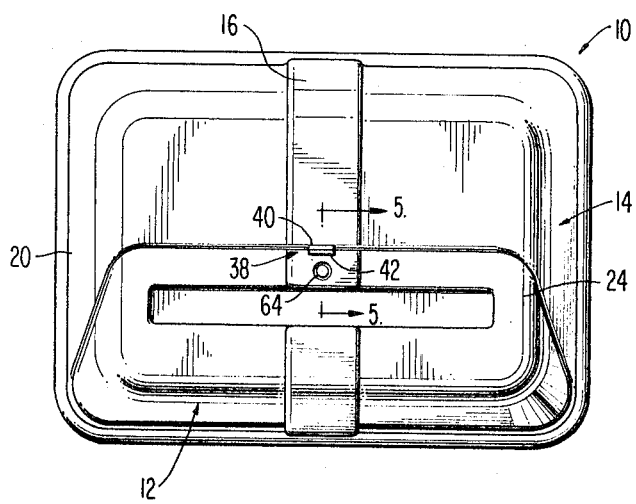
FIG. 3 is a top view of the embodiment shown in FIGS. 1 and 2.

Turning now more specifically to FIGS. 1–3, there is shown a covering 10 according to one embodiment of the present invention which is constructed as a shell structure, fabricated in two pieces 12 and 14. For convenience, the piece 12 will be referred to hereinafter as the first piece and the piece 14 will be referred to hereinafter as the second piece. Each of the pieces 12 and 14 is provided as shown with a reinforcing rib 16 which is molded with the individual pieces. The reinforcing rib 16 is provided to ensure that the covering 10 has the desired degree of structural integrity. In this regard, it is within the contemplation of the present invention to provide no ribs or additional ribs depending on the degree of structural integrity desired. Moreover, the ribs can be horizontally, rather than vertically, directed, and may even be internal rather than external. The first piece 12 and the second piece 14 are both molded preferably of high strength fire and ultraviolet resistance fiberglass. A gel-colored olive green color is envisioned, although other colors may be utilized.

The first piece 12 and the second piece 14, in assembly, form substantially a matched pair of covering portions. The result is a covering with substantially continuous surfaces which produces a very pleasing overall aesthetic effect. In assembly, the shell structure covering 10 defines a continuous front wall 18, continuous side walls 20, a rear wall 22 (See FIG. 7) and a continuous top wall 24. By continuous is here meant that the outer surfaces of the front, side and top walls lie in substantially the same plane.

The walls 18, 20 and 22 are preferably slightly inwardly inclined toward the top wall 24, although it should be understood that they may extend vertically without any inclination. The first piece 12 and the second piece 14 are relatively dimensioned to provide an optimum amount of access to the equipment being covered and in this regard to expose portions of at least two sides and preferably four sides of the equipment being covered. By way of example, preferred proportional amounts of the front, rear side and top walls occupied by the first piece 12 are approximately as follows: front wall — 75 percent; side walls — 25 percent; and top wall — 50 percent. In this way, when the first piece 12 is removed with respect to the second piece 14, an optimum amount of accessibility to the equipment is achieved. There is thereby provided more than enough room for operating personnel to use, for example, portable equipment inside of the covering 10.

Figure 4:
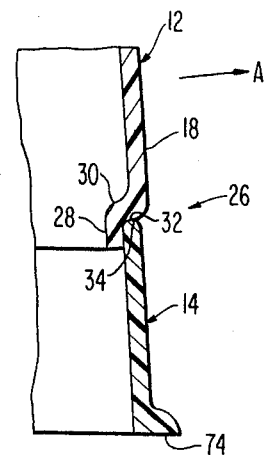
FIG. 4 is a cross-sectional view taken along the line 4—4 of FIG. 1 and illustrates a particular hinge configuration formed by the two pieces of the inventive covering.

Turning now to FIG. 4, there is shown another feature of the present invention which adds to the uniqueness, simplicity and effectiveness of the present invention. There is shown a hinge 26 which is formed along the front wall 18 by the first piece 12 and the second piece 14. The first piece 12 is provided with an offset tongue portion 28. A transition zone 30 connects the tongue portion 28 to the main portion of the first piece 12. The transition zone 30 includes a surface 32 which engages a surface 34 of the second piece 14. The edges of these surfaces are preferably sufficiently rounded to ensure uninhibited pivoting of the first piece 12 relative to the second piece 14. With this configuration, the first piece 12 is capable of pivoting about the second piece 14 in the direction of the arrow A. Also, because of the particular hinge construction, it is possible to readily remove the first piece 12 from the second piece 14 whenever desired without requiring the removal of any secondary structure or the like. Further in this regard, the present invention contemplates, in order to ensure a preferred degree of lateral stability, that the surface 34 be formed as part of a slot 36 which is shown hidden in FIG. 1.

When assembled, it is desirable to secure the first piece 12 to the second piece 14 against removal by unauthorized personnel. For this purpose, a securing assembly 38 is provided. The securing assembly 38 comprises a pair of preferably steel lugs 40 and 42. The lug 40 is secured within a slot 44 which extends through the top wall 24 of the second piece 14, while the lug 42 has a cross section in the form of an L with the horizontal leg thereof secured within a slot 46 of the top wall 24 of the first piece 12. When properly positioned, the vertical surface 48 of the lug 42 abuts the surface 50 of the top wall 24 of the first piece 12. When the two pieces are in assembly, the surface 52 of the lug 42 abuts the surface 54 of the top wall 24 of the second piece 14. Each of the lugs 40 and 42 is provided with a throughbore 56 and 58. To ensure proper alignment of the bores 56 and 58 for the reception therethrough of any conventional type of locking member (not shown), an edge 60 (discussed more fully below) is provided. The edge 60 is adapted in assembly to engage the surface 62 of the top wall 24 of the first piece 12, and in this way, cooperation in the form of alignment of the bores 56 and 58 is ensured.

The lugs 40 and 42 are retained within their respective slots 44 and 46 by, for example, an appropriate adhesive; or by a controlled localized heating of the respective pieces 12 and 14 to a degree sufficient to cause the lugs to adhere to the side walls of their respective slots. It is also contemplated by the present invention that the lower portion 46' of the slot 46 can be formed as part of the top wall 24 of the first piece 12 when the lug 42 is being secured to the top wall 24, that is to say, the lower portion 46' need not be initially an integral part of the top wall 24 of the first piece 12, although it is shown as such in FIG. 5.

Figure 5:
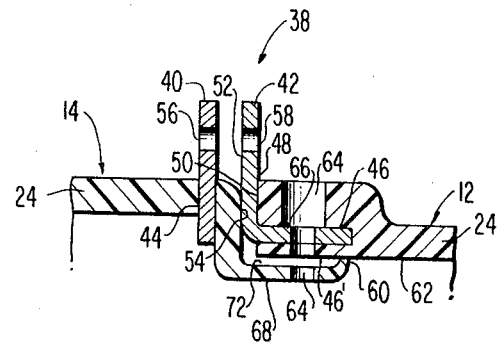
FIG. 5 is a cross-sectional view taken along the line 5—5 of FIG. 3 and illustrates details of the securing structure for securing the two pieces of the inventive covering.

Alternatively or in conjunction with the securing assembly 38, a "penta" bolt locking arrangement may also be utilized. For this purpose, a bore 64 formed by the assembly of elements shown in FIG. 5, is provided. The horizontal leg of the lug 42 forms a recessed shoulder 66 against which the head of the bolt (not shown) abuts. Preferably, the lowest portion of the bore 64 is provided with an internal thread which engages with the external thread of the bolt when the bolt is in abutment with the shoulder 66. In this arrangement the head of the bolt is recessed below the top surface of the top wall 24 of the first piece 12 and can only be engaged by an appropriate tool. Also in this arrangement, if the "penta" bolt is to be utilized to the exclusion of the securing assembly 38, then the lug 40 can be eliminated and the lug 42 can be adapted to vertically extend only to the top surface of the top wall 24. It should be noted, however, that alternatively it is contemplated that a single horizontal member be inserted in the slot 46 and that the surface 50 of the top wall 24 of the first piece 12 be extended to directly abut against the surface 54 of the top wall 24 of the second piece 14. As a further alternative, the present invention contemplates molding the top wall 24 of the first piece 12 with a bore 64 including a shoulder 66.

Figure 6:
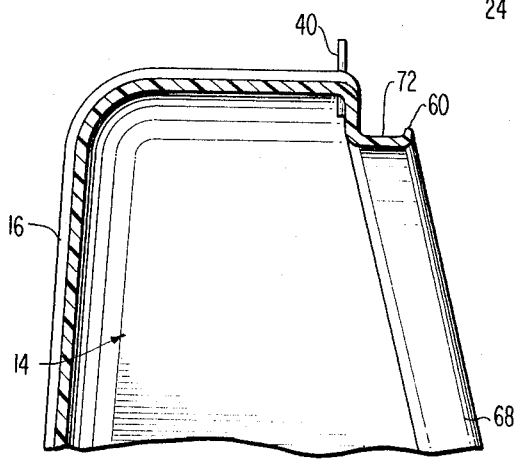
FIG. 6 is a partial side elevational view of one piece of the inventive covering illustrating the details of a run-off channel and supporting edge.

Continuing to refer to FIG. 5 and now also to FIG. 6, the top wall 24 of the second piece 14 includes a channel-forming portion 68 at the free end of which there is formed the edge 60. The channel-forming portion 68, which preferably includes the threaded portion of the bore 64, has an extent which coincides with the extent of the parting line 70 (FIG. 2) established when the first piece 12 and the second piece 14 are in assembly. The channel 72 formed by the channel-forming portion 68 serves as a water run-off channel.

The edge 60 in cooperation with the surface 54 and the hinge 26 serves to stabilize the assembly of the first piece 12 to the second piece 14.

The second piece 14, in addition to providing a rear wall and varying portions of the front, side and top walls of the covering 10, also includes a terminal surface 74 which defines an open end 76. The open end 76 represents the access opening which permits the second piece 14 to be passed over the equipment to be covered.

Figure 7:
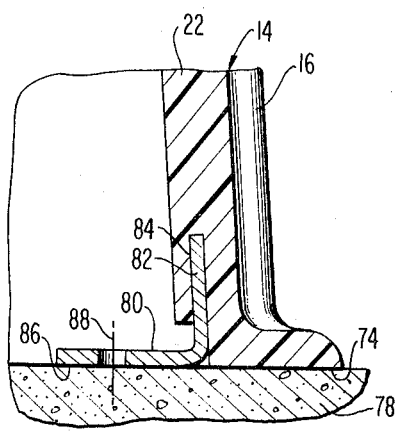
FIG. 7 is a cross-sectional view to an enlarged scale of detail (A) of FIG. 2 and illustrating details of the mounting structure of the inventive covering to the equipment pad.

The foregoing represents those aspects of the present invention which are commonly possessed by both exemplary embodiments disclosed. However, the present invention contemplates mounting the second piece 14 in either of the two ways illustrated in FIGS. 7 and 8. In FIG. 7, the second piece 14 is mounted directly to a concrete pad 78 which also serves as the mounting pad for the equipment being covered. For this purpose, preferably four steel angle members 80 are provided. The angle members 80 include vertical legs 82 which can be inserted in a slot 84 within the front wall 18 and the rear wall 22. The leg 82 may be secured within the slot 84 in a manner similar to that described above with respect to the lug 42. It is only necessary that the horizontal surface 86 of the angle member 80 lies within the plane containing the terminal surface 74. The individual angle members 80 can be fastened to the concrete base 78 by bolts 88 (shown only schematically).

Figure 8:
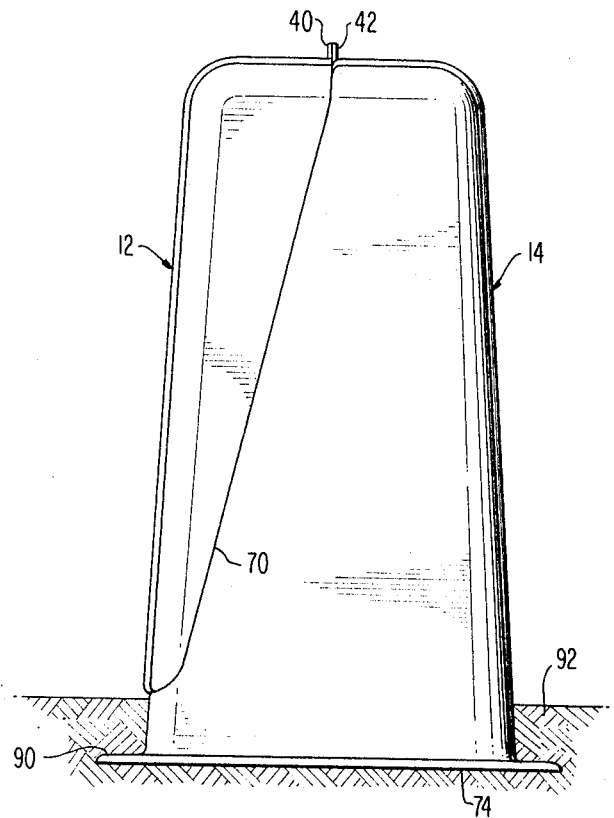
FIG. 8 is a side elevational view of another embodiment of the inventive covering illustrating a sub-surface installation.

In the event that a mounting pad is not available or not desired, the present invention contemplates utilizing a sub-surface installation for mounting the second piece 14 and consequently the covering 10. This type of installation is shown in FIG. 8. The second piece 14 has, according to this embodiment, extending from at least its front wall 18 and rear wall 22 flanges 90. The flanges 90 cooperate with the soil 92 to securely hold the second piece 14 stationary. The dimension of the flange 90 and its depth below the surface of the ground are arbitrary, it only being necessary that these two parameters be coordinated in order to effect a satisfactory mounting of the second piece 14.

As can be seen from the foregoing description, the present invention provides the existing state of the art with a covering for equipment, such as electrical equipment, which is economical and easy to manufacture, sturdy and aesthetically appealing, secure and susceptible of affording a degree of accessibility heretofore unknown.

That which is claimed is:

1. In assembly, a covering for electrical equipment and the like, comprising a shell structure fabricated in two pieces of moldable plastic with one of said pieces being mounted to the other of said pieces for pivotal movement relative thereto, said other of said pieces including means for mounting said shell in fixed relation to the electrical equipment being covered, both said pieces including cooperating means utilized to secure said pieces to each other, whereby when said pieces are assembled, said shell structure includes front and rear walls, side walls, a top wall and a terminal surface defining an open end, wherein said one of said pieces defines a portion of said front wall, portions of said side walls and a portion of said top wall, while the other of said pieces defines the remaining portion of said front wall, said rear wall, the remaining portions of said side walls, the remaining portion of said top wall and said terminal surface.

2. A covering as defined in claim 1, wherein said mounting means include a plurality of fastening members secured to the other of said pieces near the open end thereof so that said terminal surface will be substantially in abutment with a mounting pad to which said shell is to be mounted.

3. A covering as defined in claim 1, wherein said cooperating means includes a fastening member secured to and extending outwardly from the top wall portion of each of said pieces, said members having substantially aligned bores for receiving therethrough a common element for preventing relative movement between said pieces.

4. A covering as defined in claim 1, with the portion of said front wall, the portions of said side walls and the portion of said top wall occupied by said one of said pieces being approximately 75 percent, approximately 25 percent and approximately 50 percent of the total of said front wall, of said side walls and of said top wall, respectively.

5. A covering as defined in claim 1, wherein said one of said pieces includes a tongue portion and said other of said pieces includes a slot which cooperates with said tongue portion to form a hinge about which said one of said pieces pivots in its movement relative to said other of said pieces.

6. A covering as defined in claim 1, wherein said other of said pieces includes a channel-forming portion, the extent of which coincides with the parting line defined by both said pieces in assembly, said channel-forming portion having an inner abutment surface and an outer edge, the outer edge serving as a further support and stabilizing surface for said one of said pieces.

7. A covering as defined in claim 1, wherein at least said front and rear walls of said other of said pieces include a flange extending outwardly therefrom, said flanges defining a surface which coincides with said terminal surface, said flange being adapted for sub-surface installation and serving when so installed in cooperation with its immediate environment as a stabilizing and mounting means.

8. A covering as defined in claim 1, wherein said pieces are relatively dimensioned to provide access to at least two sides of the equipment being covered.

* * * * *